L. C. BAYLES.
VALVE MOTION FOR ROCK DRILLS.
APPLICATION FILED SEPT. 9, 1911.
Reissued Nov. 21, 1911.
13,317.
3 SHEETS—SHEET 1.
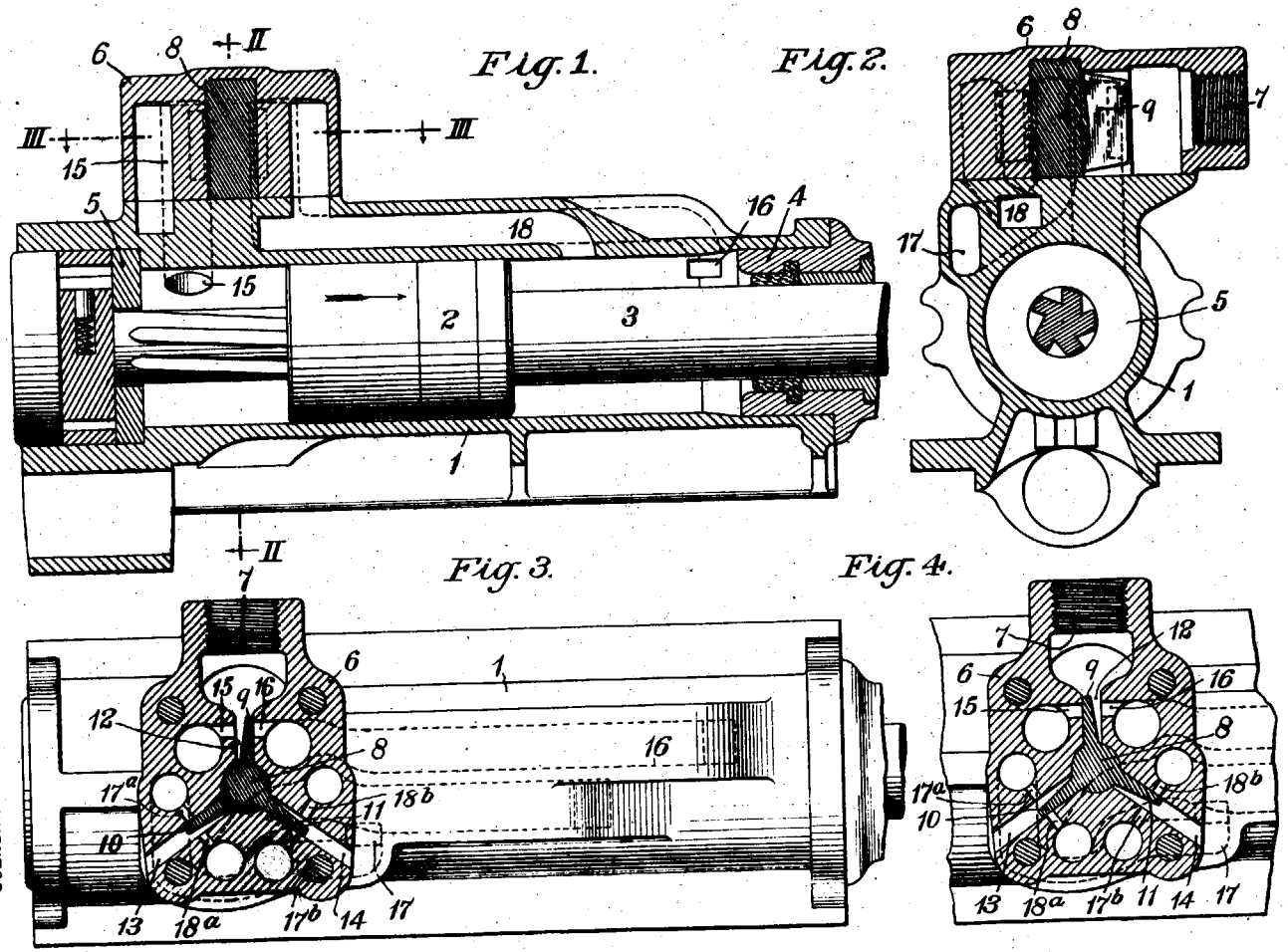
WITNESSES:
C. L. Belcher
V. S. Lloyd.
INVENTOR
Lewis C. Bayles.
BY
Brindle & Wright.
his ATTORNEYS.

L. C. BAYLES.

VALVE MOTION FOR ROCK DRILLS.

APPLICATION FILED SEPT. 9, 1911.

Reissued Nov. 21, 1911.

13,317.

3 SHEETS—SHEET 2.

Witnesses:

J. J. Lloyd

J. Frendenwall

Inventor

Lewis C. Bayles.

By his Attorneys

Prindle & Wright.

L. C. BAYLES.

VALVE MOTION FOR ROCK DRILLS.

APPLICATION FILED SEPT. 9, 1911.

Reissued Nov. 21, 1911.

13,317.

3 SHEETS—SHEET 3.

Witnesses:
P. L. Lloyd.
J. Frendenwall

Inventor
Lewis C. Bayles,
By his Attorneys
Prindle & Wright.

UNITED STATES PATENT OFFICE.

LEWIS CONDICT BAYLES, OF EASTON, PENNSYLVANIA, ASSIGNOR TO INGERSOLL-RAND COMPANY, OF NEW YORK, N. Y., A CORPORATION OF NEW JERSEY.

VALVE-MOTION FOR ROCK-DRILLS.

13,317. Specification of Reissued Letters Patent. Reissued Nov. 21, 1911.

Original No. 985,385, dated February 28, 1911, Serial No. 541,290. Application for reissue filed September 9, 1911. Serial No. 649,375.

*To all whom it may concern:*

Be it known that I, LEWIS C. BAYLES, of Easton, Pennsylvania, have invented certain new and useful Improvements in Valve-Motions for Rock-Drills, and do hereby declare that the following is a full, clear, and exact description thereof, reference being had to the accompanying drawings, in which—

Figure 5:
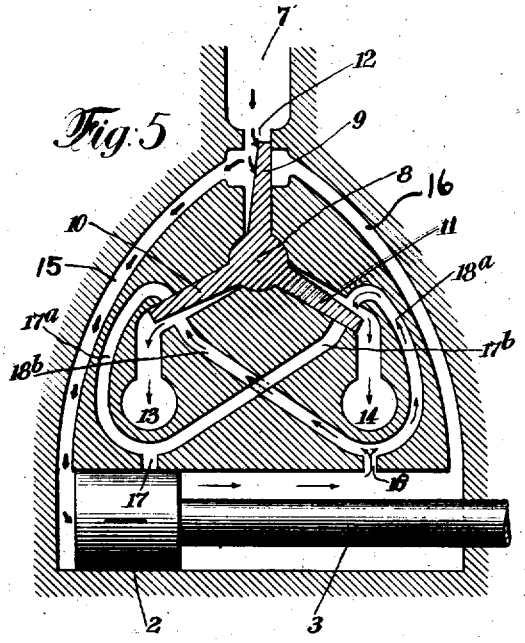
Figure 6:
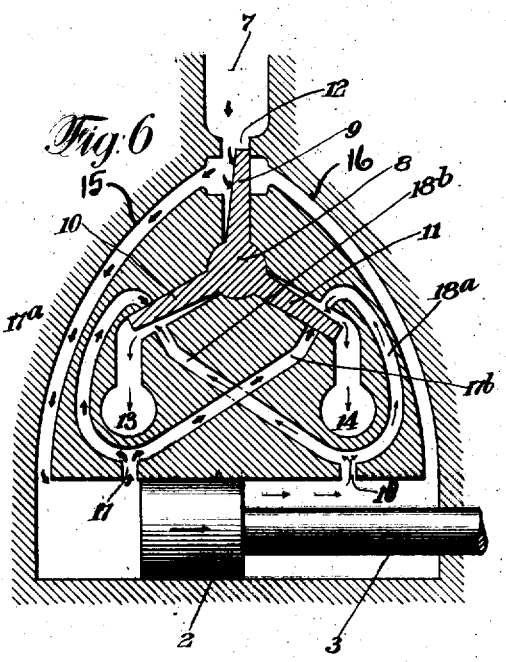
Figure 7:
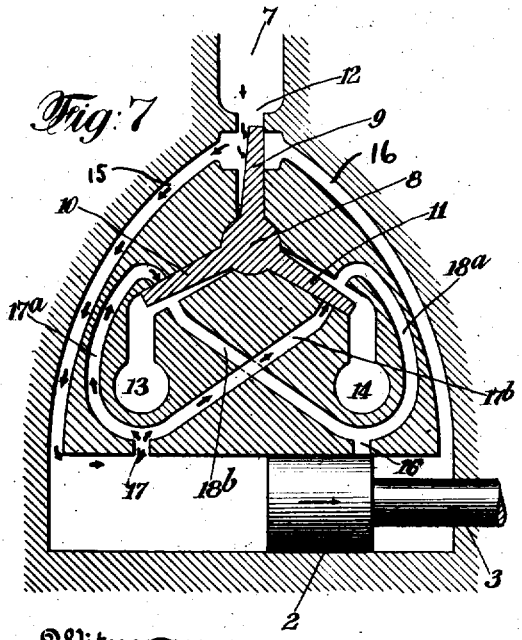
Figure 8:
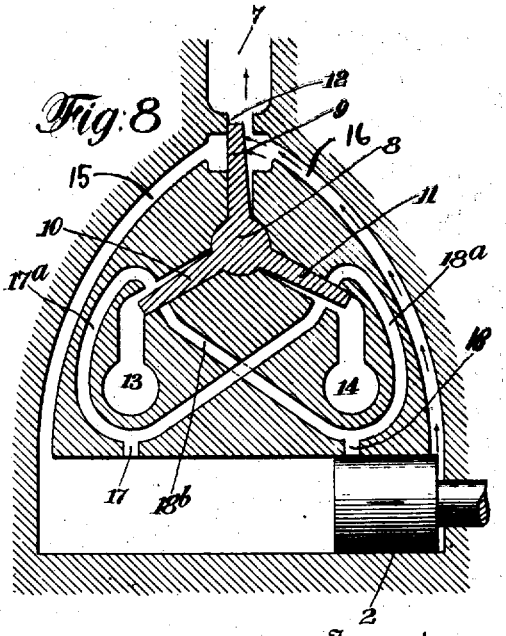
Figure 9:
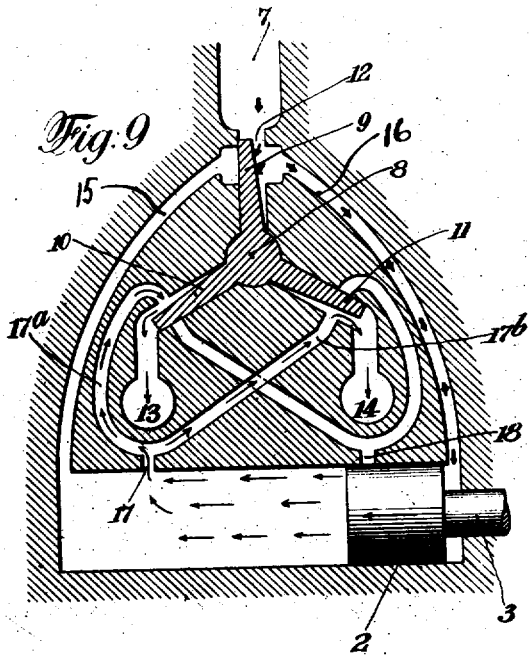
Figure 10:
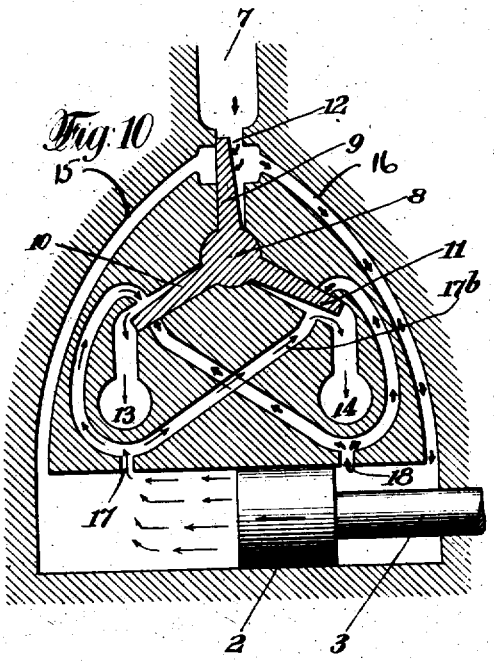
Figure 11:
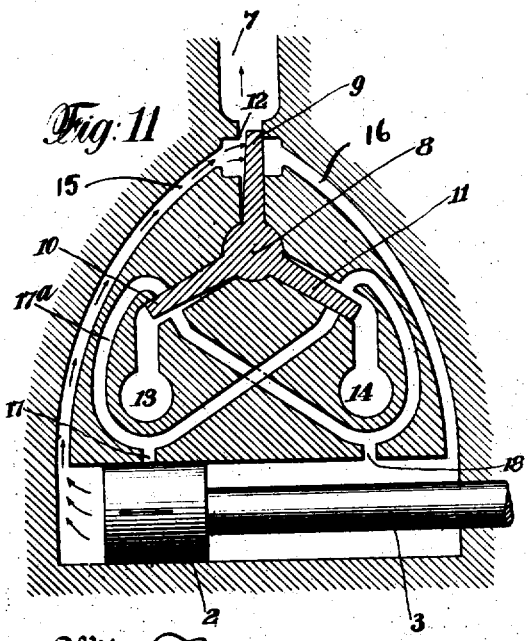
Figure 12:
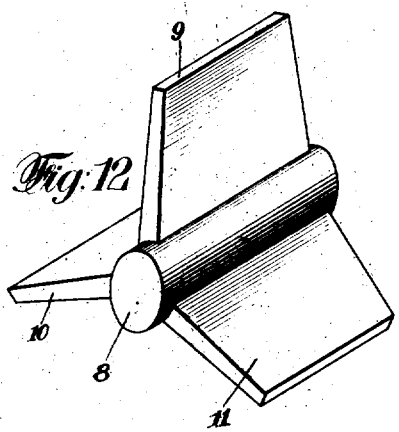

Figure 1 is a central longitudinal sectional view part of a rock drill embodying my invention; Fig. 2 is a section taken in the plane of the line 2—2 of Fig. 1 and looking in the direction of the arrows; Fig. 3 is a section on the line 3—3 of Fig. 1 and looking in the direction of the arrows; Fig. 4 is a view similar to Fig. 3 showing the valve in its position opposite to that shown in Fig. 3; Figs. 5 to 11 inclusive are diagrammatic views showing the relative positions of the parts throughout one complete double stroke of the piston from left to right and back again; and Fig. 12 is a perspective view of the valve.

The object of my invention has been to provide improvements in valve motions for rock drills, which improvements shall have, among others, the following advantages: that of providing a valve which shall be positive in its action and, at the same time, requiring but little power to operate it; that of great simplicity; that of enabling the valve to operate with a very slight movement; that of positively retaining the valve in a given position by an unbalanced pressure, and yet permitting the valve to be operated by a comparatively slight pressure; that of remaining air tight even after wear has taken place, and to such ends my invention consists in the valve motion for rock drills hereinafter specified.

In the accompanying drawings I have illustrated one embodiment of my invention, but my invention is capable of embodiment in many different forms and the illustrated embodiment is to be taken as typical only of such many other possible embodiments, and my invention is not to be limited to said embodiment or the details thereof.

In the accompanying drawings I have illustrated only so much of a rock drill as is necessary for the understanding of my invention. In such drawings a cylinder 1 contains the usual piston 2 having the piston rod 3 to which the rock drill tool is attached. The cylinder is closed at its forward end by a head 4 and at its rearward end by a head 5. A valve chest 6 is provided and is preferably mounted on the side of the cylinder. I also preferably so form the valve chest and cylinder that they are divided by a plane surface which is a construction of the utmost simplicity.

The compressed, or live, air is admitted to the valve chest by a pipe connected with the threaded inlet 7 formed on the valve chest, and the valve alternately admits the live air to each end of the cylinder to force the piston back and forth and alternately permits the air, after it has done its work, to escape from the cylinder. The form of valve in this embodiment of my invention consists of a cylindrical body 8, having three wings 9, 10 and 11 extending radially therefrom, and preferably at equal angles. These wings preferably have plane faces, and the wings preferably taper outwardly, being thinner on their outer edges than at the point of connection with the body. The valve body is mounted in a cylindrical bore, and the wings are situated in radial slots 12, 13 and 14, respectively, and such slots preferably have parallel walls. In the walls of the slot 12 are formed inlet ports 15 and 16, respectively, which extend through the walls of the cylinder to the rearward and forward ends of the cylinder, respectively. In the left hand walls of the slots 13 and 14 (as seen in Figs. 3 and 4) are formed branches $17^a$ and $17^b$, respectively, of an exhaust port 17, for the left-hand or rearward end of the cylinder. In the right-hand walls of the said slots are formed branches $18^a$ and $18^b$, respectively, of an exhaust port 18 for the right-hand end of the cylinder. The exhaust port 17 enters the cylinder at a point farther from the rear head 5 than the corresponding live air port 15, and the exhaust port 18 enters the forward end of the cylinder at a point farther from the forward cylinder head 4 than the corresponding inlet port 16. The wings of a valve are tapered and of less thickness than the slots in which they are situated, so as to permit a slight oscillatory movement, but the faces of the wings are so formed as to fit against the walls of the slots and close the ports thereof at either limit of the movement of the valve. The area of each of the inlet port openings in the walls of the slot 12 is preferably greater than that of each of the exhaust ports, as there are two exhaust ports for each end of the cylinder, the combined areas of the two exhaust ports for one end of the cylinder being preferably less than the corresponding inlet port area.

In the operation of the above illustrated valve motion, by the practice of my method of operating valve motions, and assuming the parts to be in the position shown in Figs. 1, 2, 3 and 4, and the piston to be traveling in the direction of the arrow shown thereon, the live air port 16 for the forward end of the cylinder is closed by the wing 9 of the valve and live air is being admitted to the rear end of the cylinder through the exposed port 15, driving the piston forward. The valve in this position uncovers the forward exhaust port branches 18[a] and 18[b], so that the air in front of the piston can escape. At this time the valve is firmly held in position by the unbalanced pressure of the live air on the exposed face of the wing 9, and it is held from chattering or shaking in its socket by the pressure of the air on the exposed side of its cylindrical body, tending to force that body downward, as seen in Fig. 3. This condition is maintained until the piston, in its travel, has uncovered the rear exhaust port 17, when the live air back of the piston rushes up such port and reaches the upper left-hand face of the wing 10 and the lower left-hand face of the wing 11, as seen in Fig. 3. As the live air pressure on the wings 10 and 11 is in the opposite direction, rotatively, from that on the wing 9, and as their combined areas are substantially equal to but, as shown, actually less than, the area of the port covered by the wing 9, the valve is now in a substantially balanced condition, except for the friction due to the crowding of the valve body against the side of its bore. The piston, continuing in its movement, closes the forward exhaust port 18, thus entrapping the air in the forward end of the cylinder, and compressing such air, driving it up the inlet port 16 and causing a pressure upon the right-hand face of the wing 9, as seen in Fig. 3. This pressure, being unbalanced, throws the valve to the position shown in Fig. 4, an operation which is performed with great speed and ease, because the valve has been prepared therefor by the balancing of the live air pressure thereon. The piston is now returned by a reversal of the cycle of operations before described. The live air now enters the forward inlet port 16, which has been exposed by the wing 9, and starts the piston rearward, the valve being rigidly held by the unbalanced live air pressure on such wing. The rearward exhaust port 17 being uncovered by the valve, the air toward which the piston is traveling can escape through such ports. This continues until the piston exposes the forward exhaust port 18, when the live air passing through such port reaches the upper right-hand side of the wing 11, and the lower right-hand side of wing 10, as seen in Fig. 4, and thus balances the live air pressure on the wing 9. This balances the valve, preparatory to its being thrown. The piston, continuing, closes the rear exhaust port 17, thus trapping the air in the rear end of the cylinder, compressing it and forcing it up the inlet port 15 through which it reaches the wing 9 of the valve, and throws the latter again into the position of Fig. 3, when the entire cycle is repeated. In the diagrams shown in the drawings the horizontal width of the inlet ports is purposely exaggerated to make clear the feature of having a greater pressure area on the inlet valve wing than the combined pressure areas on the exhaust wings.

I preferably extend the cylindrical body of the valve (and, consequently, the bore in which such body fits) up into the valve chest beyond the slots 12—13—and—14, as shown in Fig. 2. As the valve body is crowded toward the left, as shown in Fig. 2, by the live air, the side of the valve body toward the exhaust is crowded against the bore, or bearing, so that air is prevented from escaping over the end of the valve body and into the exhaust. The result is that air leaks up the live-air side of the valve body, and, being prevented from escape, as described, presses on the upper end of the valve body and forces the valve down upon the plane surface of the cylinder upon which the valve-chest rests. No such accumulation of pressure could occur under the valve body, because any air getting under the valve body could escape to the exhaust and, not being entrapped, no pressure could accumulate. This arrangement keeps the valve body pressed down upon the said plane surface, and prevents an escape of air beneath the valve body as well as above it, so that the valve is tight without its having a bearing formed in the plane surface of the cylinder. To form such a bearing would involve some expense, and to form it in exactly the right position, so that when the valve-chest is in place on the cylinder, the said bearing would be perfectly in line with the valve body (as would have to be in a commercial tool) would be quite an expensive operation.

It will be observed that a rock drill, or other fluid-operated percussion tool, constructed and operated according to my invention, is exceedingly simple. The valve is simple in construction consisting of but a single piece. It has but a slight movement, and is not likely to be broken. During the early part of the travel of the piston, the valve is positively held in position by the pressure of the live air on a single wing, and cannot be shaken out of position by the unavoidable vibration of this type of tools. Notwithstanding the said great security against shaking the valve out of position, the valve is thrown to the new position by the utilization of very little power, since it is balanced before this movement takes place, by the admission of live air to the ports where a rotative effect opposite from that of the live air pressure beforementioned will be produced. This makes it possible to throw my valve with less pressure than that of the live air pressure. This ease of throwing my valve has two great advantages, viz: that the valve can be quickly thrown, and that the wear on the valve in turning is reduced to a minimum. Not only is my valve held from rotation by the unbalanced pressure of the live air on one of its wings during the early part of the piston travel, but as the live air tends to force the valve body against opposite bearing surface, the friction thus produced tends to prevent the accidental movement of the valve. The pressure of the live air on the top of the valve body, tending, as it does, to hold the valve down upon the supporting surface on the cylinder, prevents the escape of air underneath the valve body. This permits great simplicity of construction, in that it permits the supporting surface on the cylinder to be made plain, and requires no special bearing for the lower end of the valve body, and no exact positioning of the valve-chest and valve in any particular location on such surface.

My three-winged valve motion providing, as it does, two exhaust ports, enables me to provide a freer exhaust for a given length of movement of the valve than would be the case if only one exhaust port were provided. It is desirable not to have the live air space between the live air wing and the adjacent slot walls too large, and therefore desirable to have a small movement of the valve, and this condition can be fulfilled in my three-winged valve and yet ample exhaust space between the exhaust wing of the valve and the adjacent slot walls can be provided, because there are two of such wings. The function performed by the two exhaust wings with the branched exhaust ports could be performed by a single exhaust wing and unitary exhaust slots. This is the subject of another application for patent, Serial No. 525,022.

It is to be understood that my valve motion and method of operating the same are adapted for use with percussive tools for many purposes, and operated by various fluids.

I claim:

1. The combination of a cylinder, a piston, a valve-chest, an exhaust port opening into the valve-chest and a fluid-operated, oscillating valve arranged to open and close said port by a movement toward and away from the surface through which it opens.

2. The combination of a cylinder, a piston, a valve-chest, an exhaust port opening into the valve-chest and a fluid-operated, oscillating valve arranged to open and close said port by a movement substantially perpendicular to the surface through which it opens.

3. The combination of a cylinder, a piston, a valve-chest, an exhaust port for each end of the cylinder, said ports opening into the valve-chest, and a fluid-operated, oscillating valve arranged to open and close said ports by a movement substantially perpendicular to the surfaces through which they open.

4. The combination of a cylinder, a piston, a valve-chest, an exhaust port for each end of the cylinder, said ports opening into the valve-chest, and a fluid-operated oscillating valve arranged to open and close said ports by a movement substantially perpendicular to the surfaces through which they open.

5. The combination of a cylinder, a piston, a valve-chest, an exhaust port for each end of the cylinder, said ports opening into the valve-chest, and a fluid-operated, oscillating valve arranged to open and close said ports by a movement substantially in line with the openings of said ports in the valve-chest.

6. The combination of a cylinder, a piston, a valve-chest, a separate exhaust port for each end of the cylinder, said ports opening into the valve-chest, and a fluid-operated valve having a plate-shaped part arranged to open and close said ports by a movement substantially perpendicular to the surfaces through which they open into the valve-chest.

7. The combination of a cylinder, a piston, a valve-chest, a separate exhaust port for each end of the cylinder, said ports opening into the valve-chest, and a fluid-operated winged valve arranged to open and close said ports by a wing movement substantially perpendicular to the surfaces through which said ports open into the valve-chest.

8. The combination of a cylinder, a piston, a valve-chest, an inlet and an exhaust port connecting said valve-chest with one end of such cylinder, said exhaust port entering said cylinder at a point farther removed from said end of said cylinder than said inlet, a reciprocating valve adapted to close said ports in the valve-chest, the movements of said valve being toward and away from surfaces through which said ports open into the valve-chest, the closing movement of said valve for the inlet port being opposite to its closing movement for the exhaust port, and inlet and exhaust ports connected to the opposite end of the cylinder and controlled by said valve, admission to the said first mentioned end of said cylinder being closed when the exhaust port is closed by the piston.

9. The combination of a cylinder, a piston, a valve-chest, an inlet and an exhaust port connecting said valve-chest with one end of such cylinder, said exhaust ports entering said cylinder at a point farther removed from said end of said cylinder than said inlet, a reciprocating valve adapted to close said ports in the valve-chest, the movements of said valve being toward and away from surfaces through which said ports open into the valve-chest, the closing movement of said valve for the inlet port being opposite to its closing movement for the exhaust port, and means controlled by said valve for admitting air for the opposite end of the cylinder, admission to the said first mentioned end of said cylinder being closed when the exhaust port is closed by the piston.

10. The combination of a cylinder, a piston, a valve-chest, a live air port connecting each end of said cylinder with said valve-chest, an exhaust port connecting each end of said cylinder with said valve-chest, said exhaust ports entering said cylinder at points farther removed from their respective ends than the corresponding inlet ports, and a reciprocating valve adapted to close said ports in the valve-chest, movements of said valve being toward and away from the surfaces through which said ports open into the valve-chest, admission to the said first mentioned end of said cylinder being closed when the exhaust port is closed by the piston.

11. The combination of a cylinder, a piston, a valve-chest, a live air port connecting each end of said cylinder with said valve-chest, an exhaust port connecting each end of said cylinder with said valve-chest, said exhaust ports entering said cylinder at points farther removed from their respective ends than the corresponding inlet ports, and a reciprocating valve adapted to close said ports in the valve-chest, the inlet and exhaust ports on the same end of the cylinder opening toward said valve in opposite directions, relative to the reciprocation of the valve, admission to the said first mentioned end of said cylinder being closed when the exhaust port is closed by the piston.

12. The combination of a cylinder, a piston, a valve-chest, live air port connecting each end of said cylinder with said valve-chest, an exhaust port connecting each end of said cylinder with said valve-chest, said exhaust ports entering said cylinder at points farther removed from their respective ends than the corresponding inlet ports, and a reciprocating valve adapted to close said ports in the valve-chest, the inlet and exhaust ports on the same end of the cylinder entering the valve-chest from opposite directions relative to the line of movement of the valve, admission to the said first mentioned end of said cylinder being closed when the exhaust port is closed by the piston.

13. The combination of a cylinder, a piston, a valve-chest, a live air port connecting each end of said cylinder with said valve-chest, an exhaust port connecting each end of said cylinder with said valve-chest, said exhaust ports entering said cylinder at points farther removed from their respective ends than the corresponding inlet ports, and an oscillating valve adapted to open and close said ports by movements toward and away from the surfaces through which they enter the valve-chest.

14. The combination of a cylinder, a piston, a valve-chest, a live air port connecting each end of said cylinder with said valve-chest, an exhaust port connecting each end of said cylinder with said valve-chest, said exhaust ports entering said cylinder at points farther removed from their respective ends than the corresponding inlet ports, and an oscillating valve adapted to open and close said ports, the inlet and exhaust ports on the same end of the cylinder approaching said valve from opposite directions, relative to the movement of the valve.

15. The combination of a cylinder, a piston, a valve-chest, inlet ports connecting said valve-chest with the opposite ends of said cylinder, exhaust ports connecting said valve-chest with the opposite ends of said cylinder, but at points farther removed from their respective ends than said inlet ports, said valve-chest having a single inlet chamber therein and a reciprocating valve adapted to close said ports by movements toward and away from the surfaces through which they enter the valve-chest, admission to the said first mentioned end of said cylinder being closed when the exhaust port is closed by the piston.

16. The combination of a cylinder, a piston, a valve-chest, inlet ports connecting said valve-chest with the opposite ends of said cylinder, exhaust ports connecting said valve-chest with the opposite ends of said cylinder, but at points farther removed from their respective ends than said inlet ports, said valve-chest having a single inlet chamber therein, a reciprocating valve adapted to close said ports, the corresponding inlet and exhaust ports approaching said valve from opposite directions, relative to the reciprocation of the valve, admission to the said first mentioned end of said cylinder being closed when the exhaust port is closed by the piston.

17. The combination of a cylinder, a piston, a valve-chest, a winged valve in said valve-chest, a single inlet chamber occupied by one of said wings, inlet ports extending from said chamber to opposite ends of said cylinder and exhaust ports extending from said valve-chest to opposite ends of said cylinder, but entering said cylinder at points farther removed from their respective ends than the corresponding inlet ports, said valve being adapted to close said exhaust ports by movements toward and from the surfaces through which said ports enter said valve-chest.

18. The combination of a cylinder, a piston, a valve-chest, a winged valve in said valve-chest, a single inlet chamber occupied by one of said wings, inlet ports extending from said chamber to opposite ends of said cylinder, and exhaust ports extending from said valve-chest to opposite ends of said cylinder, but entering said cylinder at points farther removed from their respective ends than the corresponding inlet ports, said valve being adapted to close said exhaust ports, said exhaust ports approaching said valve from opposite directions, relative to the line of reciprocation thereof.

19. The combination of a cylinder, a piston, a valve-chest, said valve-chest being divided from said cylinder by a geometrical surface and an oscillating valve mounted in said valve-chest on said surface and substantially perpendicular to said surface.

20. The combination of a cylinder, a piston, a valve-chest, said valve-chest being divided from said cylinder by a plane surface, an oscillating valve mounted in said valve-chest on said surface and on an axis perpendicular to said surface.

21. The combination of a cylinder, a piston, a valve-chest, an oscillating valve mounted in said chest and having wings, an inlet port connecting said cylinder and valve-chest, and opening opposite one of said wings, an exhaust port connecting said valve-chest and cylinder, and opening opposite another wing.

22. The combination of a cylinder, a piston, a valve-chest, an oscillating valve mounted in said chest and having wings, an inlet port connecting said cylinder and valve-chest and opening opposite one of said wings, an exhaust port connecting said valve-chest and cylinder, and opening opposite another wing, said exhaust port being farther from the head of the cylinder than said inlet port.

23. The combination of a valve-chest having live air and exhaust chambers, a valve pivoted between said chambers and having a wing extending into each of said chambers, said valve having a cylindrical body, said body extending beyond said wings, and a cylindrical bore in said valve-chest in which said body is pivoted.

24. The combination of a cylinder, a piston, and a valve chest, said valve chest having a cylindrical bore and walled slots radiating therefrom, a valve having a cylindrical body mounted in said bore and wings occupying said slots, and inlet and exhaust ports extending from the walls of said slots to said cylinder and adapted to be opened and closed by said wings.

25. The combination of a cylinder, a piston, and a valve-chest, said valve-chest having a cylindrical bore and parallel-walled slots radiating therefrom, a valve having a cylindrical body mounted in said bore and tapered wings occupying said slots, and ports extending from the walls of said slots to said cylinder and adapted to be opened and closed by said wings.

26. The combination of a cylinder, a piston, a valve-chest, said valve-chest being divided from said cylinder by a plane surface, a cylindrical bore in said valve-chest, substantially perpendicular to said surface, parallel-walled slots radiating from said bore, a valve having a cylindrical body mounted in said bore, and having tapered wings occupying said slots, and ports opening through the walls of said slots and extending to said cylinder, one end of said valve body being squared to fit said surface.

27. The combination of a cylinder, a piston, a valve-chest, said valve-chest being divided from said cylinder by a plane surface, a cylindrical bore in said valve-chest substantially perpendicular to said surface, parallel-walled slots radiating from said bore, a valve having a cylindrical body mounted in said bore, and having tapered wings occupying said slots, inlet ports opening through opposite walls of one of said slots, and extending to opposite ends of said cylinder, respectively, one end of said valve body being squared to fit said surface, and exhaust ports opening through the walls of another of said slots and extending to opposite ends of said cylinder, respectively.

28. The combination of a cylinder, a piston, a valve-chest, said valve-chest being divided from said cylinder by a plane surface, a cylindrical bore in said valve-chest substantially perpendicular to said surface, parallel-walled slots radiating from said bore, a valve having a cylindrical body mounted in said bore and having tapered wings occupying said slots, inlet ports opening through opposite walls of one of said slots and extending to opposite ends of said cylinder, respectively, one end of said valve body being squared to fit said surface, and exhaust ports opening through the walls of another of said slots and extending to opposite ends of said cylinder, respectively, said exhaust ports entering said cylinder at points farther removed from their respective ends of said cylinder than the corresponding inlet ports.

29. The combination of a cylinder, a piston, a valve-chest, said valve-chest being divided from said cylinder by a plane surface, a cylindrical bore in said valve-chest perpendicular to said surface, slots radiating from said bore, said bore extending farther into said valve-chest than do said slots, a valve having a cylindrical body mounted in said bore, said body extending into said bore beyond said slots, the opposite end of said valve body being squared to fit said surface, and means on said valve body for controlling ports in said slots, the pressure in the slots on one side of said body being greater than the pressure on the other side thereof.

30. The combination of a cylinder, a piston, a valve-chest, said valve-chest being divided from said cylinder by a plane surface, a cylindrical bore in said valve-chest perpendicular to said surface, opposite slots radiating from said bore, said bore extending into said valve-chest deeper than said slots, a valve having a cylindrical body mounted in said bore and extending beyond said slots, the lower end of said valve body being squared to fit said surface, said valve body having means in said slots for opening and closing ports therein, one of said slots being constantly occupied by live air, and a slot on the opposite side being connected with the exhaust.

31. The combination of a part having a parallel-walled slot, a valve comprising a cylindrical body and a tapered wing attached thereto and mounted in said slot, said taper being such that said wing can seat itself against said walls.

32. The combination of a part having a parallel-walled slot, a valve comprising a cylindrical body and a plurality of tapered wings attached thereto and mounted in said slot, said taper being such that said wings can seat themselves against said walls.

33. The combination of a part having a parallel-walled slot, a valve comprising a cylindrical body and a plurality of tapered wings attached thereto and mounted in said slot, said taper being such that said wings can seat themselves against said walls, said wings being symmetrically placed on said body.

34. A cylinder having inlet and discharge passages, its piston, a valve-chest, and a valve comprising a central body portion and a plurality of wings projecting outwardly beyond the body portion, said wings being arranged to control the opening and closing of both the inlet and discharge passages when the valve is at the limits of its movements.

35. A cylinder having inlet and discharge passages, its piston, a valve-chest and a valve comprising a central body portion and a plurality of wings projecting outwardly beyond the body portion, said wings being arranged to open and close both the inlet and discharge passages when the valve is at the limits of its movements.

36. A cylinder having inlet and discharge passages, its piston, a valve-chest and an oscillating valve comprising a central body portion and a plurality of wings projecting outwardly beyond the body portion, said wings being arranged to control the opening and closing of both the inlet and discharge passages when the valve is at the limits of its movements.

37. A cylinder having inlet and discharge passages, its piston, a valve-chest and an oscillating valve comprising a central body portion and a plurality of wings projecting outwardly beyond the body portion, said wings being arranged to open and close both the inlet and discharge passages when the valve is at the limits of its movements.

38. A cylinder having independent inlet and discharge passages for both ends, its piston, a valve-chest and a valve comprising a central body portion and a plurality of wings projecting outwardly beyond the body portion, said wings being arranged to control the opening and closing of both the inlet and discharge passages when the valve is at the limits of its movements.

39. A cylinder having independent inlet and discharge passages for both ends, its piston, a valve-chest and a valve comprising a central body portion and a plurality of wings projecting outwardly beyond the body portion, said wings being arranged to open and close both the inlet and discharge passages when the valve is at the limits of its movements.

40. A cylinder having independent inlet and discharge passages for both ends, its piston, a valve-chest and an oscillating valve comprising a central body portion and a plurality of wings projecting outwardly beyond the body portion, said wings being arranged to control the opening and closing of both the inlet and discharge passages when the valve is at the limits of its movements.

41. A cylinder having independent inlet and discharge passages for both ends, its piston, a valve-chest and an oscillating valve comprising a central body portion and a plurality of wings projecting outwardly beyond the body portion, said wings being arranged to open and close both the inlet and discharge passages when the valve is at the limits of its movements.

42. A cylinder, its piston, a valve-chest, a valve comprising a central body portion and a plurality of wings projecting therefrom, and inlet and discharge passages opening to the faces of the valve wings arranged to be opened and closed thereby.

43. A cylinder, its piston, a valve-chest having independent inlet and discharge passages for both ends of the cylinder and a fluid-actuated valve comprising a central body portion and a plurality of wings projecting outwardly from the body portion arranged to simultaneously open the inlet passage for one end and the discharge passage for the other end of the cylinder.

44. A cylinder, its piston, a valve-chest having independent inlet and discharge passages for both ends of the cylinder and a fluid-actuated valve comprising a central body portion and a plurality of wings projecting outwardly from the body portion arranged to simultaneously open the inlet passage for one end and the discharge passage for the other end of the cylinder, and close the other inlet and discharge passages.

45. A cylinder, its piston, a valve-chest having independent inlet and discharge passages for both ends of the cylinder and a fluid-actuated oscillating valve comprising a central body portion and a plurality of wings projecting outwardly from the body portion arranged to simultaneously open the inlet passage for one end of the cylinder and the discharge passage for the other end of the cylinder.

46. A cylinder, its piston, a valve-chest having independent inlet and discharge passages for both ends of the cylinder and a fluid-actuated oscillating valve comprising a central body portion and a plurality of wings projecting outwardly from the body portion arranged to simultaneously open the inlet passage for one end of the cylinder and the discharge passage for the other end of the cylinder, and close the other inlet and discharge passages.

47. A cylinder, its piston, a plural winged valve, a valve-chest, and independent inlet and discharge passages for both ends of the cylinder opening to the faces of the valve wings, said valve being arranged to simultaneously open the inlet passage for one end and the discharge passage for the other end of the cylinder.

48. A cylinder, its piston, a plural winged valve, a valve-chest, and independent inlet and discharge passages for both ends of the cylinder opening to the faces of the valve wings, said valve being arranged to simultaneously open the inlet passage for one end and the discharge passage for the other end of the cylinder, and close the other inlet and discharge passages.

49. A cylinder, its piston, a plural winged oscillating valve, a valve-chest, and independent inlet and discharge passages for both ends of the cylinder opening to the faces of the valve wings, said valve being arranged to simultaneously open the inlet passage for one end and the discharge passage for the other end of the cylinder.

50. A cylinder, its piston, a plural winged oscillating valve, a valve-chest, and independent inlet and discharge passages for both ends of the cylinder opening to the faces of the valve wings, said valve being arranged to simultaneously open the inlet passage for one end and the discharge passage for the other end of the cylinder, and close the other inlet, and discharge passages.

51. A cylinder, its piston, a valve-chest having independent inlet and discharge passages for both ends of the cylinder and a three-winged oscillating valve having one wing arranged to alternately open and close the inlet passages and the other wings arranged to alternately open and close the discharge passages.

52. A cylinder, its piston, a valve-chest, independent inlet and discharge passages for both ends of the cylinder having ports opening into the valve-chest and a valve arranged to open and close said ports by a movement substantially perpendicular to the faces of the ports.

53. A cylinder, its piston, a valve-chest containing a valve chamber having three radially disposed slots, one communicating with the motive fluid inlet and the other two with external atmosphere, inlet passages for both ends of the cylinder leading to the inlet slot, discharge passages for both ends of the cylinder leading to the exhaust slots, and a three-winged oscillating valve seated in the valve chamber with its wings located in said slots for alternately opening and closing the inlet and discharge passages.

54. The combination of a cylinder, a piston, a valve-chest, a live air port connecting each end of said cylinder with said valve-chest, an exhaust port connecting each end of said cylinder with said valve-chest, and a reciprocating valve adapted to open and close said ports by movements toward and away from the surfaces through which they enter the valv chest, the inlet and exhaust ports on the same end of the cylinder approaching said valve from opposite directions relative to the movement of the valve, said exhaust ports being of smaller area than said inlet ports.

55. The combination of a cylinder, a piston, a valve-chest, an oscillating valve mounted in said chest and having wings on opposite sides of its axis, an inlet port connecting said cylinder and valve-chest and opening opposite one of said wings, an exhaust port connecting said valve-chest and cylinder and opening opposite a wing on the opposite side of the axis, the product of the area and distance from the axis of said exhaust port being less than the corresponding product of the inlet port.

56. The combination of a cylinder, a piston, a valve-chest, an oscillating valve mounted in said chest and having wings on opposite sides of its axis, an inlet port connecting said cylinder and valve-chest and opening opposite one of said wings, an exhaust port connecting said valve-chest and cylinder and opening opposite a wing on the opposite side of said axis, said exhaust port being farther from the head of the cylinder than said inlet port and of smaller area than said inlet port.

57. The combination of a cylinder, a piston, a valve-chest, a live air port connecting each end of said cylinder with said valve-chest, an exhaust port connecting each end of said cylinder with said valve-chest, and a reciprocating valve adapted to open and close said ports by movements toward and away from the surfaces through which they enter the valve-chest, the inlet and exhaust ports on the same end of the cylinder approaching said valve from opposite directions relative to the movement of the valve, said exhaust ports being of less area than said inlet ports, and entering the cylinder farther from the head of the cylinder than the corresponding inlet ports.

In testimony that I claim the foregoing as my invention, I have signed my name in presence of two witnesses, this 16th day of August, 1911.

LEWIS CONDICT BAYLES.

Witnesses:

EDWIN J. PRINDLE,
J. FREUDENVOLL.

Copies of this patent may be obtained for five cents each, by addressing the "Commissioner of Patents. Washington, D. C."